US 8,677,357 B2

(12) United States Patent
Ammons et al.

(10) Patent No.: US 8,677,357 B2
(45) Date of Patent: Mar. 18, 2014

(54) METHOD AND APPARATUS FOR DISTRIBUTING A COMPOSITE SOFTWARE STACK AS A VIRTUAL MACHINE IMAGE

(75) Inventors: Glenn S. Ammons, Dobbs Ferry, NY (US); Vasanth Bala, Rye, NY (US); Todd W. Mummert, Danbury, CT (US); Darrell C. Reimer, Tarrytown, NY (US); Xiaolan Zhang, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 13/014,085

(22) Filed: Jan. 26, 2011

(65) Prior Publication Data

US 2012/0192179 A1 Jul. 26, 2012

(51) Int. Cl.
*G06F 9/455* (2006.01)

(52) U.S. Cl.
USPC ............................................. 718/1; 718/100

(58) Field of Classification Search
None
See application file for complete search history.

(56) References Cited

U.S. PATENT DOCUMENTS

| 7,373,451 | B2 * | 5/2008 | Lam et al. ................... 711/6 |
| 7,856,439 | B2 * | 12/2010 | Alpern et al. ................ 707/756 |
| 7,856,440 | B2 * | 12/2010 | Alpern et al. ................ 707/756 |
| 7,890,689 | B2 * | 2/2011 | Lam et al. ................... 711/6 |
| 7,996,414 | B2 * | 8/2011 | Alpern et al. ................ 707/758 |
| 8,108,855 | B2 * | 1/2012 | Dias et al. ................... 717/177 |
| 8,219,592 | B2 * | 7/2012 | Alpern et al. ................ 707/803 |
| 8,407,804 | B2 * | 3/2013 | Todorovic ................... 726/26 |
| 2005/0125513 | A1 * | 6/2005 | Lam et al. ................... 709/220 |
| 2007/0204153 | A1 * | 8/2007 | Tome et al. ................. 713/164 |
| 2009/0300151 | A1 * | 12/2009 | Friedman et al. ............ 709/222 |
| 2011/0265076 | A1 * | 10/2011 | Thorat et al. ................ 717/172 |
| 2012/0124581 | A1 * | 5/2012 | Nitta ........................... 718/1 |

OTHER PUBLICATIONS

Reimer et al., "Opening Black Boxes: Using Semantic Information to Combat Virtual Machine Image Sprawl", VEE, Seattle, WA, (Mar. 2008).

* cited by examiner

*Primary Examiner* — Van Nguyen
(74) *Attorney, Agent, or Firm* — Ryan, Mason & Lewis, LLP (57) ABSTRACT

Methods and apparatus are provided for distributing a composite software stack as a virtual appliance. A new virtual appliance is published by obtaining a parent virtual appliance; configuring the new virtual appliance; obtaining file level differences between the parent virtual appliance and the new virtual appliance; and publishing the new virtual appliance as a patch comprising the file level differences relative to the parent virtual appliance. The file level differences comprise one or more of additions, deletions and modifications to the parent virtual appliance. An update to a given virtual appliance can be published as a fix pack, wherein the fix pack comprises file level differences relative to the given virtual appliance. An end user obtains a desired virtual appliance is obtained (for example, from a library of virtual appliances) by selecting the desired virtual appliance; obtaining metadata for the desired virtual appliance comprising an identifier of a patch file and a parent virtual appliance; and applying the patch file to the parent virtual appliance to get a modified virtual appliance.

13 Claims, 5 Drawing Sheets

METHOD AND APPARATUS FOR DISTRIBUTING A COMPOSITE SOFTWARE STACK AS A VIRTUAL MACHINE IMAGE

FIELD OF THE INVENTION

The present invention relates generally to the electrical, electronic and computer arts, and, more particularly, to software distribution techniques.

BACKGROUND OF THE INVENTION

Virtual appliances (also referred to as "virtual machine images" or "virtual images") are emerging as a new vehicle for software packaging and distribution. Virtual appliances allow the tested state of a fully operational software stack to be captured and distributed, instead of a collection of install packages with complicated install and configuration instructions that the customer has to carefully follow to achieve the same result.

Virtual appliance marketplaces are emerging that enable software publishers to sell their products as pre-configured virtual appliances (see, for example, the VMWare Virtual Appliance Marketplace. In addition, emerging "compute clouds" provide virtual appliance libraries where users and software publishers can add virtual images that may then be used by other cloud users, potentially for a fee (see, for example, the Amazon Elastic Compute Cloud, available at http://aws.amazon.com/ec2/). New Enterprise products are also being developed that contain an internal virtual appliance library pre-populated with virtual images created by the product vendor (see, for example, Websphere Cloudburst Appliance, commercially available from IBM Corporation).

An obstacle to the widespread adoption of virtual appliances as software distribution vehicles is that virtual appliances typically consist of a complete software stack, where the publisher of the image may only own a component of that stack. The component owned by the publisher is typically dependent on other components owned by different organizations. In a conventional software distribution model, the publisher would provide only their own component (for example, as an install package), and document the prerequisite components that the customer has to acquire, install and configure to create the final software stack where the publisher's component is operational.

In a virtual image, however, the publisher does the integration of the full stack, as opposed to the customer. Thus, the publisher becomes an implicit re-distributor of all of the other software components required to create the virtual image. In addition, "open source" components do not fix this problem. For example, if a publisher uses Open SUSE Linux as the operating system (OS) component in a virtual image, the customer of that image must still accept the Open SUSE license agreement. This license, however, is for the original Open SUSE distribution, which may have been modified in the process of creating the publisher's virtual image. The customer may want to know exactly what parts of the original Open SUSE distribution were modified by the software publisher in creating the integrated virtual image.

A need therefore exists for improved methods and apparatus for distributing a composite software stack as a virtual appliance. A further need exists for improved methods and apparatus for distributing a virtual appliance, without becoming a re-distributor of all components of the software stack.

SUMMARY OF THE INVENTION

Generally, methods and apparatus are provided for distributing a composite software stack as a virtual appliance. According to one aspect of the invention, software is published by providing one or more virtual appliances (for example, in a library of virtual appliances), wherein each virtual appliance comprises a patch comprising file level differences relative to a parent virtual appliance. The file level differences comprise one or more of additions, deletions and modifications to the parent virtual appliance. According to a further aspect of the invention, an update to a given virtual appliance can be published as a fix pack, wherein the fix pack comprises file level differences relative to the given virtual appliance.

According to another aspect of the invention, a new virtual appliance is published by obtaining a parent virtual appliance; configuring the new virtual appliance; obtaining file level differences between the parent virtual appliance and the new virtual appliance; and publishing the new virtual appliance as a patch comprising the file level differences relative to the parent virtual appliance.

The new virtual appliance can optionally be tested as part of the publication process. In addition, legal and/or engineering evaluations can optionally be performed on the file level differences. The published virtual appliance can optionally be digitally signed by the publisher.

According to yet another aspect of the invention, a desired virtual appliance is obtained (for example, from a library of virtual appliances) by selecting the desired virtual appliance; obtaining metadata for the desired virtual appliance comprising an identifier of a patch file and a parent virtual appliance, wherein the patch file comprises file level differences between the desired virtual appliance and the parent virtual appliance; and applying the patch file to the parent virtual appliance to get a modified virtual appliance. The end user can optionally accept licenses for the desired virtual appliance and parent virtual appliances.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for distributing software in the form of a virtual appliance. According to one aspect of the invention, the publisher does not have to become a re-distributor of all components of the software stack. Generally, the publisher creates a virtual appliance by extending a virtual appliance that is already in a library. The new virtual appliance comprises a patch comprising file level differences relative to the parent virtual appliance.

Thus, the present invention publishes a virtual appliance by only publishing a patch relative to another virtual appliance that already exists. In this manner, a publisher can make an operational software stack available in a manner that allows the consumer of the virtual image to understand the ancestry of the components of the image. Each publisher can test and certify a fully operational software stack that contains their contribution, without having to become a re-distributor of all of its dependent components.

Figure 1:
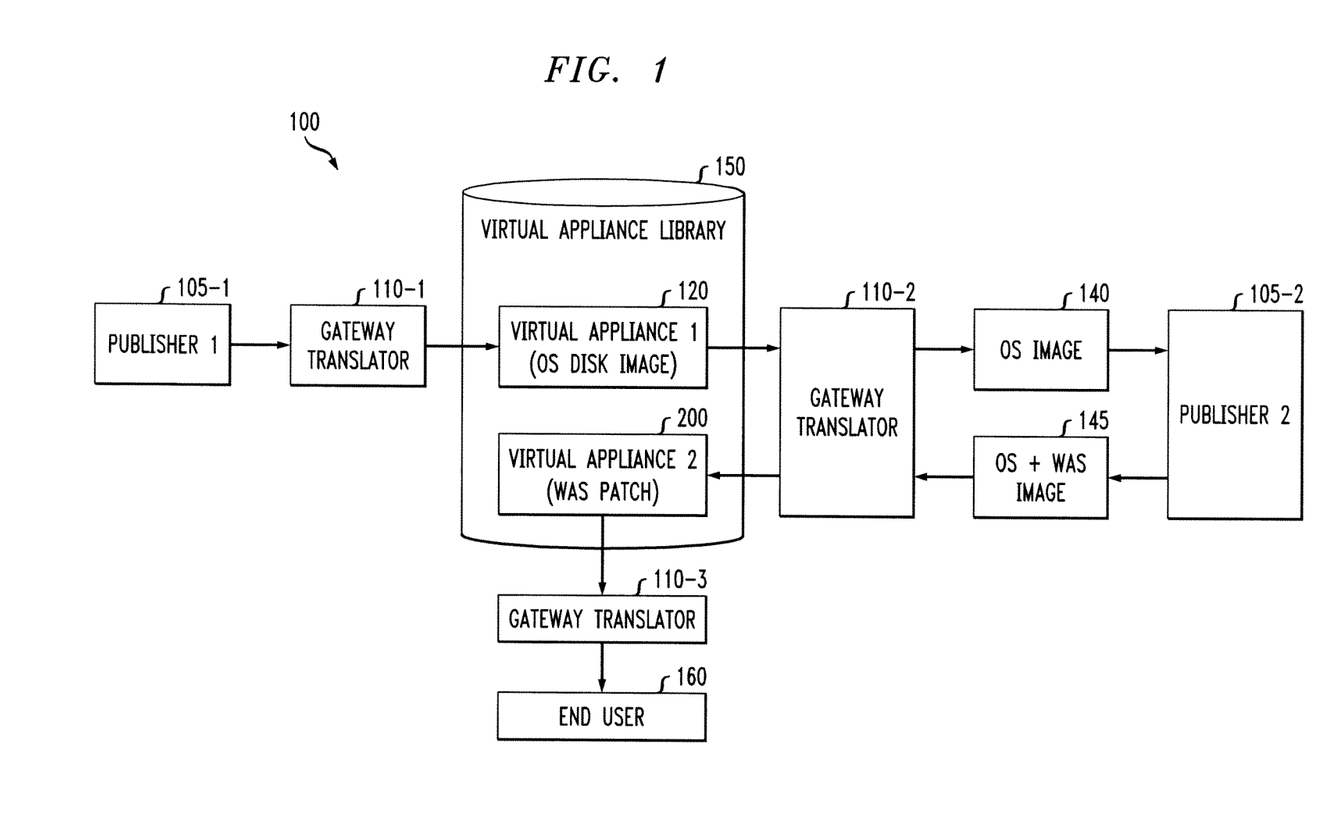
FIG. 1 illustrates an exemplary network environment in which the present invention can operate.

FIG. 1 illustrates an exemplary network environment 100 in which the present invention can operate. As shown in FIG. 1, an aspect of the invention provides a virtual appliance library 150 comprised of a plurality of virtual appliances provided by one or more publishers 105 for use by one or more end users 160.

The virtual appliance library 150 may be implemented, for example, as a public domain library of virtual appliances, based on a virtual image management technology that uses a file level versioned repository to store virtual appliances, instead of a conventional disk based representation. See, for example, D. Reimer et al., "Opening Black Boxes: Using Semantic Information to Combat Virtual Machine Image Sprawl" Proc. of the 2008 ACM International Conference on Virtual Execution Environments (VEE 2008) incorporated by reference herein.

As shown in FIG. 1, the library 150 comprises at least one virtual appliance 120 that is a "root" image (such as an OS Disk Image, e.g., a fully installed and configured OpenSUSE Linux OS image, available from Opensuse.org). In a further variation, a central library 150 is not required. In an alternate embodiment, a base-image publisher 105-1 would distribute (for example, on the base-image publisher's website) the base image. A patch publisher 105-2 would distribute (for example, on the patch publisher's website) a patch and tell end users 160 that the patch applies only to a particular base image (for example, a base image with a certain SHA1 checksum). The patch publisher 105-2 would also tell end users 160 that the "known good" image (that is, the intended result of applying the patch to the correct base image) has a particular SHA1 checksum. The end user 160 would download the base image from the base-image publisher, compute its checksum, download the patch and the two checksums from the patch publisher, verify that the checksum of the base image matches the patch publisher's base-image checksum, apply the patch, and verify that the resulting image's checksum matches the "known good" image's checksum.

The publisher 105-2 of a new virtual appliance, such as second virtual appliance 200 (such as a WAS Patch), discussed further below in conjunction with FIG. 2, creates the new virtual appliance 200 by extending an existing virtual appliance 120 that is already in the library 150. For example, if a publisher 105-2 wants to create a WebSphere Application Server (WAS) based on the OS disk image 120, the publisher 105-2 obtains an OS Image 140 associated with the existing virtual appliance 120 and extends the OS Image 140 to create a modified OS plus WAS Image 145 that becomes the Virtual Appliance 200 (a WAS patch).

As discussed further below in conjunction with FIG. 3, the WAS patch comprises file level differences between the OS plus WAS Image 145 and the parent virtual appliance (OS Image 140). As previously noted, publishing the virtual appliance extensions as file level differences removes the need for the publishers of the virtual appliance extensions to acquire redistribution rights for the parent image.

An end user 160 can select a virtual appliance 120, 200 and retrieve the selected virtual appliance 120, 200 from the library 150. As discussed further below in conjunction with FIG. 4, an exemplary end user virtual appliance retrieval process 400 can be employed to assist an end user 160 with the selection and retrieval of a virtual appliance 120, 200 from the library 150. In various implementations, an end user 160 can be, for example, (i) a cloud customer that accesses the library 150 via a cloud; (ii) an enterprise customer that accesses the library 150 via a cloudburst appliance; or (iii) an enterprise customer that accesses the library 150 via one or more federated local enterprise repositories.

As shown in FIG. 1, one or more gateway translators 110-1 through 110-3 can optionally be employed to translate communications between the domain specific environments of end users 160 and/or publishers 105. In addition, as discussed with FIGS. 3 and 4, the gateway translators 110-1 through 110-3 can optionally perform a number of the tasks contained in the exemplary publish process 300 and/or end user virtual appliance retrieval process 400.

Figure 2:
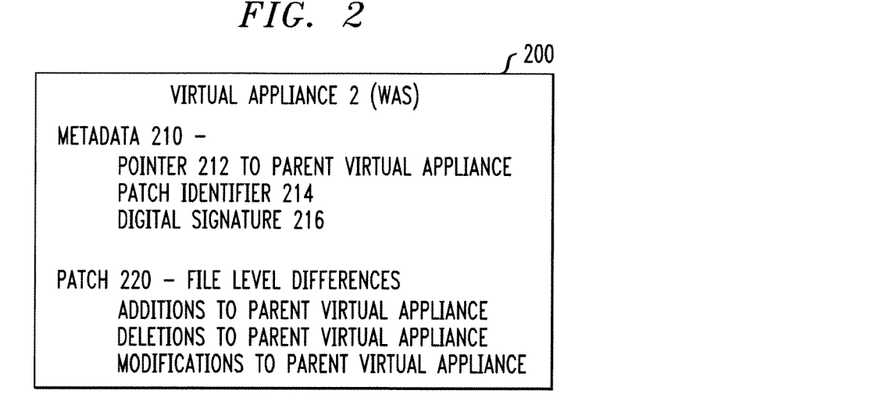
FIG. 2 illustrates an exemplary virtual appliance.

FIG. 2 illustrates an exemplary virtual appliance, such as the Virtual Appliance 200 shown in FIG. 1. As shown in FIG. 2, the exemplary Virtual Appliance 200 comprises metadata 210 and a patch 220. The metadata 210 further comprises a pointer 212 to a parent virtual appliance, a patch identifier 214 that identifies the appropriate patch 220, and a digital signature 216.

The patch 220 comprises file level differences relative to the parent virtual appliance. For example, the file level differences comprise one or more files added to, deleted from, or modified in the parent image.

Generally, the virtual appliance comprises a disk image or one or more patches to a disk image. The parent pointer 212 for a disk image is a Null value. As discussed further below in conjunction with FIG. 4, an exemplary end user virtual appliance retrieval process 400 constructs the virtual appliance 200 by applying the corresponding patch 220 to the parent virtual appliance to get a new disk image.

Figure 3:
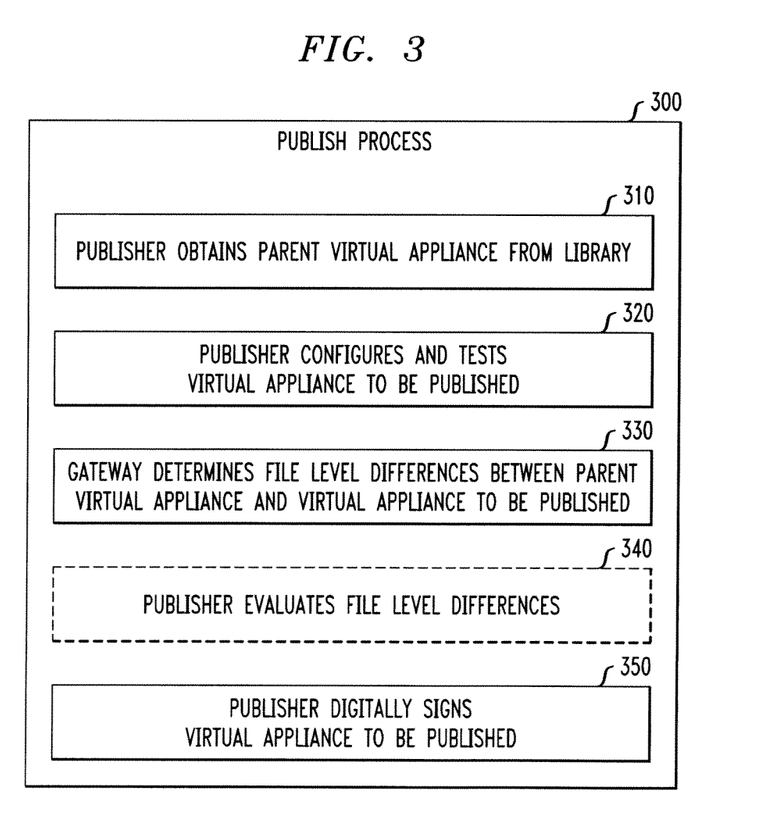
FIG. 3 is a flow chart describing an exemplary implementation of a publish process.

FIG. 3 is a flow chart describing an exemplary implementation of a publish process 300. As previously indicated, the publisher 105-2 of a new virtual appliance, such as second virtual appliance 200, creates the new virtual appliance 200 by extending an existing virtual appliance 120 that is already in the library 150.

As shown in FIG. 3, the publisher 105-2 initially obtains the parent virtual appliance 120 from the library 150 during step 310. Thereafter, the publisher 105-2 configures and tests the new virtual appliance 200 to be published during step 320. In this manner, the exemplary publish process 300 allows the publisher 105-2 to integrate and test the resulting virtual appliance 200.

Thereafter, during step 330, the gateway 110-2 determines the file level differences between the parent virtual appliance 120 and the virtual appliance 200 to be published.

During step 340, the publisher 105-2 optionally evaluates the file level differences. For example, the publisher 105-2 can perform a legal and/or engineering analysis on the file level differences. With a legal evaluation, for example, the publisher 105-2 can confirm that the patch does not contain the intellectual property of others.

With conventional software distribution as install packages, engineers examine the install packages, but only the end user ever looks at the result of installing a package on a particular system. The present invention, on the other hand, allows engineers to evaluate the file level differences to understand how installing the package affected the parent appliance, to validate that the result is the desired effect, and, to make any necessary changes. In addition, an engineer can modify the file level differences in ways that are hard to achieve by other means. For example, simply starting an instance of a virtual appliance changes the disk image of the virtual appliance (e.g., log files are modified and files that act as caches change). This causes "cruft" that can be removed from a file-level patch but can't be avoided if an instance is started.

Finally, in the exemplary implementation of the publish process 300, the publisher 105-2 digitally signs the virtual appliance 200 to be published, during step 350.

Figure 4:
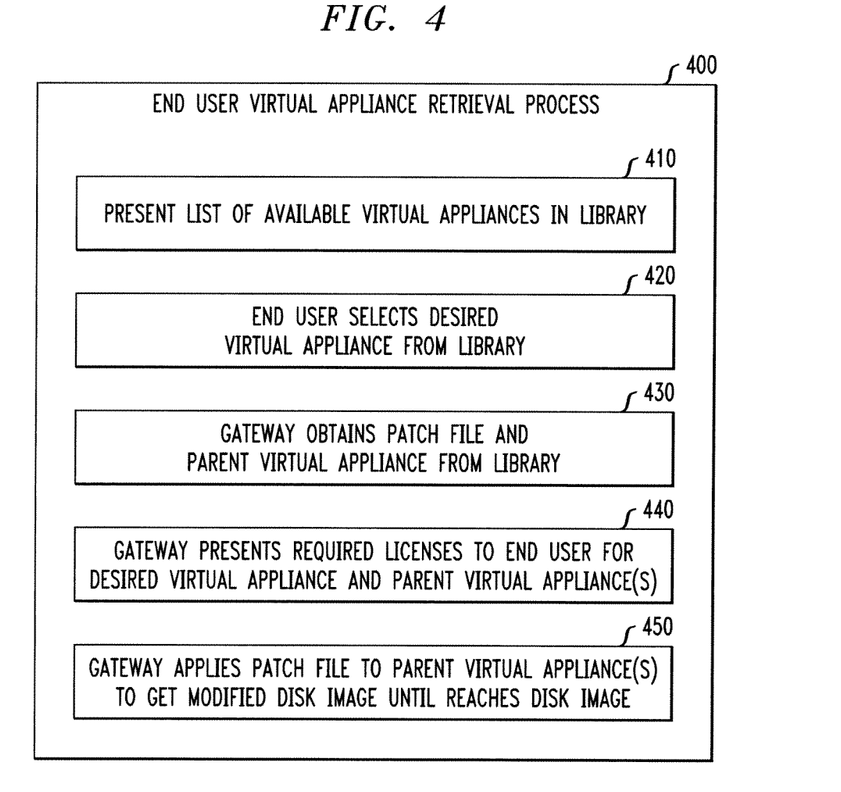
FIG. 4 is a flow chart describing an exemplary implementation of an end user virtual appliance retrieval process.

FIG. 4 is a flow chart describing an exemplary implementation of an end user virtual appliance retrieval process 400. As previously indicated, the end user virtual appliance retrieval process 400 can be employed to assist an end user 160 with the selection and retrieval of a virtual appliance 120, 200 from the library 150.

As shown in FIG. 4, the exemplary end user virtual appliance retrieval process 400 initially presents a list of available virtual appliances in the library 150 to the end user 160 during step 410. The end user 160 then selects one or more desired virtual appliances from the library 150 during step 420.

In an exemplary implementation, the gateway 110-3 obtains the patch file and parent virtual appliance for the selected virtual appliance from the library 150 during step 430. The gateway 110-3 then presents any required licenses to the end user 160 during step 440 for the desired virtual appliance and any parent virtual appliance(s).

Finally, the gateway 110-3 applies the patch file to the parent virtual appliance(s) to get a modified disk image during step 450 until the disk image is reached. Generally, the modified disk image comprises the original disk image as modified by patches in path between the selected virtual appliance up to the root image. In this manner, the exemplary end user virtual appliance retrieval process 400 may be recursive, with the "base" image could be the result of applying a patch to yet another image.

The end user 160 or a third party can optionally evaluate the file level differences of the obtained virtual appliance. For example, an enterprise end user 160 may want to verify that the obtained virtual appliance does not contain code that could damage systems of the enterprise, or to minimize changes to an existing system. In a further example, a publisher of the parent virtual appliance may want to evaluate the file level differences of any patches that are based on the parent virtual appliance, for example, to ensure that the rights of the parent publisher are not violated.

The benefit to the end user 160 is that they get a fully operational software stack with the selected virtual appliance pre-integrated and tested with specific versions of any parent virtual appliances. The end user 160 is aware of exactly what portion of each image was altered by the next image in the provenance chain. In addition, the file-level patches of the present invention allow an end user, at retrieval time, to inspect the patches and determine whether or not he or she likes them. It is noted that users will trust publishers to varying degrees. For example, a user might trust the publisher of the base image (and so not inspect the base image closely) but have less trust for the publisher of the patch (and thus will inspect the patch more closely).

The benefit to the publisher 105-2 of the selected virtual appliance is that they can distribute a full virtual appliance software stack without negotiating re-distribution rights with any parent virtual appliances, because the end user 160 does not download the image from the publisher 105-2, and the publisher 105-2 only contributed a patch over the parent virtual appliances. The library 150 now contains an image for each virtual appliance, each contributed by a different software publisher, with the provenance history (in terms of what files are different) between the child and parent images.

In publishing a virtual appliance, the publisher has certified that the image is a working and tested software stack. This process can be repeated many times by other software publishers to produce a provenance tree whose nodes consist of certified images.

Figure 5:
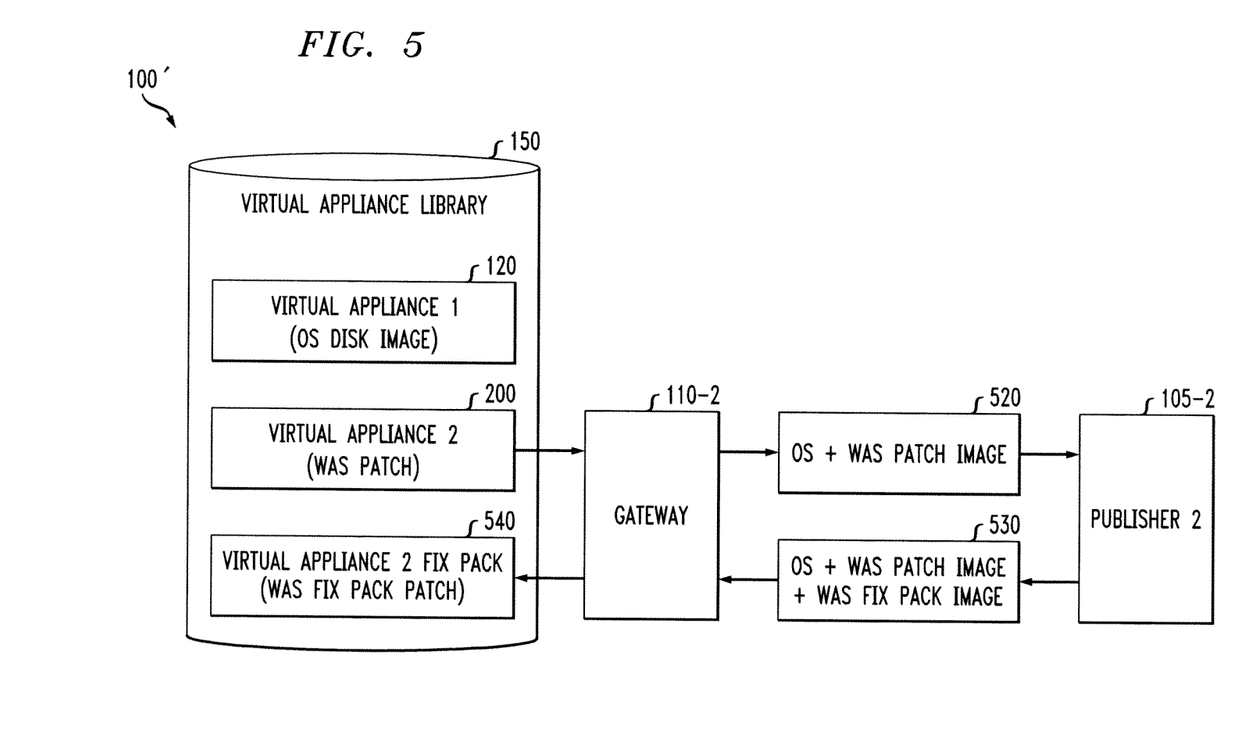
FIG. 5 illustrates the exemplary network environment of FIG. 1, as modified to reflect an update to an existing virtual appliance as a "fix pack," in accordance with another aspect of the invention.

FIG. 5 illustrates the exemplary network environment 100 of FIG. 1, as modified to reflect an update to an existing virtual appliance as a "fix pack," in accordance with another aspect of the invention. As shown in FIG. 5, The virtual appliance library 150, and virtual appliances 120, 200 operate in a similar manner to the corresponding elements of FIG. 1. As shown in FIG. 5, if the publisher 105-2 desires to update the virtual appliance 200, the publisher 105-2 can employ the gateway 110-2 to obtain the OS+WAS patch image 520 associated with the virtual appliance 200 from the library 150. The publisher 105-2 can modify the OS+WAS patch image 520 to create a new image 530 (i.e., an OS+WAS Patch Image+WAS Fix Pack Image).

The publish process 300 is employed to publish the new image 530 as a "fix pack." Upon publication, the fix pack appears in the library 150 as virtual appliance 2 fix pack (WAS Fix Pack Patch) 540. In one exemplary implementation, the library 150 can automatically notify each of the end users 160 that obtained the virtual appliance 200 of the availability of a new update in the form of a fix pack. Thereafter, the gateway 110-3 associated with the end user 160 can retrieve the corresponding fix pack 540 from the library 150 and apply it to the local image associated with the virtual appliance 200.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
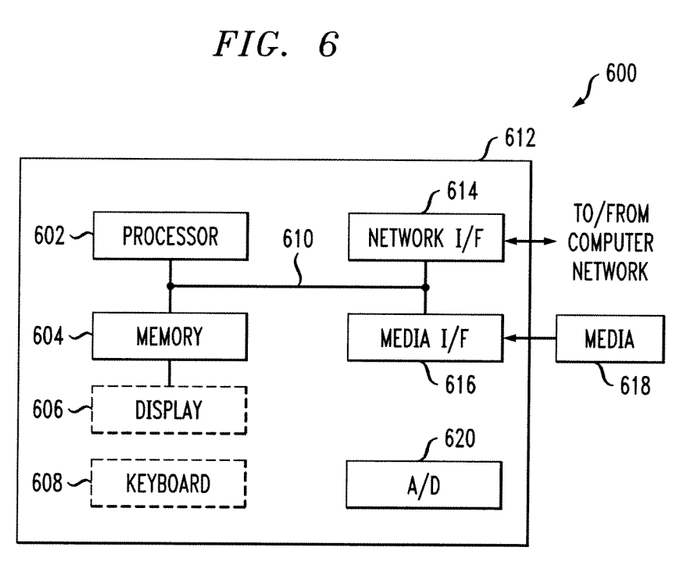
FIG. 6 depicts a computer system that may be useful in implementing one or more aspects and/or elements of the present invention.

One or more embodiments can make use of software running on a general purpose computer or workstation. FIG. 6 depicts a computer system 600 that may be useful in implementing one or more aspects and/or elements of the present invention. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Analog-to-digital converter(s) 620 may be provided to receive analog input, such as analog video feed, and to digitize same. Such converter(s) may be interconnected with system bus 610.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 1002. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for publishing a new virtual appliance, the apparatus comprising:
    a memory; and
    at least one processor, coupled to the memory, operative to
        obtain a parent virtual appliance;
        configure said new virtual appliance;
        obtain file level differences between said parent virtual appliance and said new virtual appliance; and
        publish said new virtual appliance as a patch comprising said file level differences relative to said parent virtual appliance, wherein a publisher of said parent virtual appliance is a different entity than a publisher of said new virtual appliance.

2. The apparatus of claim 1, wherein said processor is further configured to test said new virtual appliance.

3. The apparatus of claim 1, wherein said processor is further configured to perform one or more of a legal evaluation and an engineering evaluation on said file level differences.

4. The apparatus of claim 1, wherein said processor is further configured to digitally sign said new virtual appliance.

5. The apparatus of claim 1, wherein said new virtual appliance is published in a library of virtual appliances.

6. An apparatus for obtaining a desired virtual appliance, the apparatus comprising:
    a memory; and
    at least one processor, coupled to the memory, operative to:
    select said desired virtual appliance;
    obtain metadata for said desired virtual appliance comprising an identifier of a patch file and a parent virtual appliance, wherein said patch file comprises file level differences between said desired virtual appliance and said parent virtual appliance; and
    apply said patch file to said parent virtual appliance to get a modified virtual appliance, wherein a publisher of said parent virtual appliance is a different entity than a publisher of said desired virtual appliance.

7. The apparatus of claim 6, further wherein said processor is further configured to accept licenses for said desired virtual appliance and parent virtual appliances.

8. The apparatus of claim 6, wherein said desired virtual appliance is obtained from a library.

9. The apparatus of claim 6, wherein said processor is further configured to perform one or more of a legal evaluation and an engineering evaluation on said file level differences.

10. An apparatus for publishing software, the apparatus comprising:
    a memory; and
    at least one processor, coupled to the memory, operative to:

provide one or more virtual appliances, wherein each virtual appliance comprises a patch comprising file level differences relative to a parent virtual appliance, wherein a publisher of said patch is a different entity than a publisher of said parent virtual appliance.

11. The apparatus of claim 10, wherein said file level differences comprise one or more of additions, deletions and modifications to said parent virtual appliance.

12. The apparatus of claim 10, wherein said at least one processor is further configured to publish an update to a given virtual appliance as a fix pack, wherein said fix pack comprises file level differences relative to said given virtual appliance.

13. The apparatus of claim 10, wherein said one or more virtual appliances are provided in a library of virtual appliances.

* * * * *